United States Patent
Resch

(10) Patent No.: US 9,009,491 B2
(45) Date of Patent: Apr. 14, 2015

(54) DISTRIBUTED STORAGE NETWORK AND METHOD FOR ENCRYPTING AND DECRYPTING DATA USING HASH FUNCTIONS

(71) Applicant: Jason K. Resch, Chicago, IL (US)

(72) Inventor: Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 37 days.

(21) Appl. No.: 13/736,848

(22) Filed: Jan. 8, 2013

(65) Prior Publication Data

US 2013/0124875 A1 May 16, 2013

Related U.S. Application Data

(63) Continuation of application No. 12/814,467, filed on Jun. 13, 2010, now Pat. No. 8,351,600.

(60) Provisional application No. 61/256,411, filed on Oct. 30, 2009.

(51) Int. Cl.
*H04L 9/08* (2006.01)
*G06F 11/10* (2006.01)
*G06F 21/62* (2013.01)
*G06F 12/14* (2006.01)
*H04L 29/08* (2006.01)
*H04L 29/06* (2006.01)

(52) U.S. Cl.
CPC .......... *H04L 9/0819* (2013.01); *G06F 11/1004* (2013.01); *G06F 21/6218* (2013.01); *G06F 2221/2107* (2013.01); *G06F 2221/2151* (2013.01); *H04L 9/0863* (2013.01); *H04L 9/0894* (2013.01); *H04L 2209/34* (2013.01); *G06F 12/1408* (2013.01); *H04L 67/1097* (2013.01); *H04L 69/04* (2013.01)

(58) Field of Classification Search
CPC .................................................. G06F 12/1408
USPC ........................................................... 713/189
See application file for complete search history.

(56) References Cited

U.S. PATENT DOCUMENTS

| 7,636,724 | B2 | 12/2009 | de la Torre et al. | |
|---|---|---|---|---|
| 2003/0084020 | A1* | 5/2003 | Shu | 707/1 |
| 2004/0049700 | A1* | 3/2004 | Yoshida | 713/201 |
| 2006/0034453 | A1* | 2/2006 | Liu | 380/28 |

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

*Primary Examiner* — Jacob Lipman
(74) *Attorney, Agent, or Firm* — Garlick & Markison; Timothy W. Markison

(57) ABSTRACT

A DS processing unit includes a grid module and a DSN interface. The grid module is operable to encrypt a data segment and to decrypt an encrypted data segment. To encrypt the data segment, the grid module partitions the data segment into portions and encrypts the portions using encryption keys generated from other portions to produce encrypted portions. The grid module then dispersed storage error encodes the encrypted portions to produce a set of encoded data slices, which the DSN interface outputs to a DSN. The DSN interface also receives a set of encoded data slices, which the grid module disperse storage error decodes to produce the encrypted data segment. The grid module then partitions the encrypted data segment into encrypted data portions and decrypts the encrypted data portions using decryption keys generated from other encrypted data portions to produce decrypted portions of a recovered data segment.

17 Claims, 10 Drawing Sheets

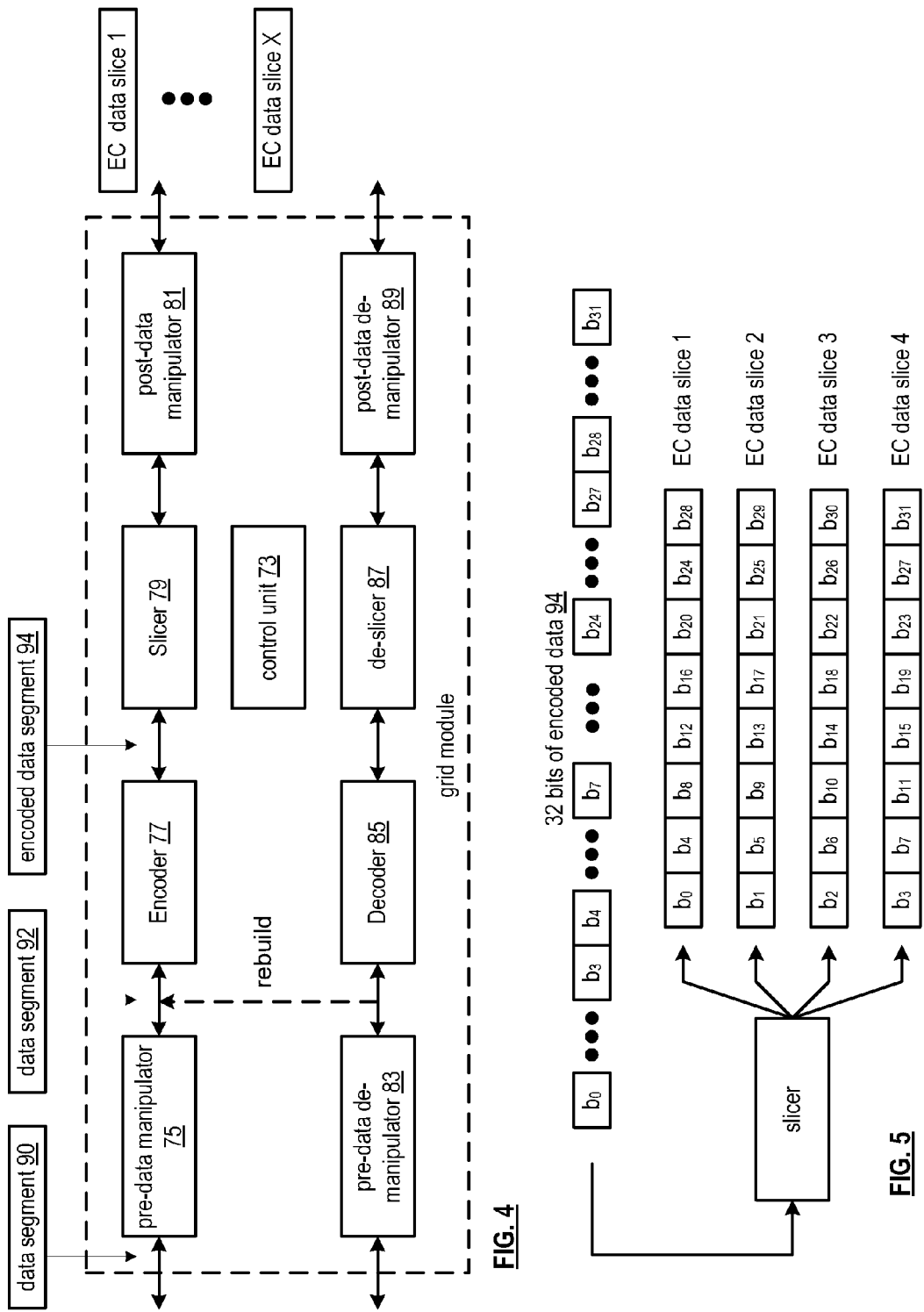

DISTRIBUTED STORAGE NETWORK AND METHOD FOR ENCRYPTING AND DECRYPTING DATA USING HASH FUNCTIONS

CROSS REFERENCE TO RELATED PATENTS

This patent application is claiming priority under 35 USC §120 as a continuing patent application of co-pending patent application entitled "A DISTRIBUTED STORAGE NETWORK AND METHOD FOR ENCRYPTING AND DECRYPTING DATA USING HASH FUNCTIONS", having a filing date of Jun. 13, 2010, and a Ser. No. 12/814,467, which is incorporated herein by reference, and which claims priority pursuant to 35 U.S.C. §119(e) to U.S. Provisional Application Ser. No. 61/256,411, entitled "DISTRIBUTED STORAGE NETWORK DATA PROCESSING", filed Oct. 30, 2009, expired, which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing and more particularly to storage of information.

2. Description of Related Art

Computing systems are known to communicate, process, and store data. Such computing systems range from wireless smart phones to data centers that support millions of web searches, stock trades, or on-line purchases every day. Computing processing is known to manipulate data from one form into another. For instance, raw picture data from an image sensor may be compressed, or manipulated, in accordance with a picture compression standard to produce a standardized compressed picture that can be saved or shared with others. Computer processing capability continues to advance as processing speed advances and software applications that perform the manipulation become more sophisticated.

With recent advances in computing processing speed and communication speed, computers may manipulate real time media from voice to streaming high definition (HD) video. Purpose-built communications devices, like the cell phone, are being replaced or augmented by more general-purpose information appliances. For example, smart phones can support telephony communications but they are also capable of text messaging, and accessing the internet to perform functions including email, web browsing, remote applications access, and media communications. Media communications may include telephony voice, image transfer, music files, video files, real time video streaming, and more.

Each type of computing system is constructed, and hence operates, in accordance with one or more communication, processing, and storage standards. With such standards, and with advances in technology, more and more of the global information content is being successfully converted into electronic formats and consumed by users in these electronic formats. For example, more digital cameras are now being sold than film cameras, thus producing more digital pictures that are shared and viewed electronically. High growth rates have consistently been observed for web-based programming. Web-based programming is electronically distributing among billions of users a large amount of content over the Internet and this content was, until recently, all broadcast by just a few entities over the air television stations and cable television providers. Digital content standards, such as used in pictures, papers, books, video entertainment, home video, all enable this global transformation to a digital format. Electronic content pervasiveness is producing increasing demands on the storage function of computing systems.

A typical computer storage function includes one or more memory devices that match the needs of the various operational aspects of the processing and communication functions. For example, a memory device may include solid-state NAND flash, random access memory (RAM), read only memory (ROM), a mechanical hard disk drive, or other types of storage. Each type of memory device has a particular performance range, use case, operational environment, and normalized cost. The computing system architecture optimizes the use of one or more types of memory devices to achieve the desired functional, cost, reliability, performance goals, etc. of the computing system. Generally, the immediacy of access dictates what type of memory device is used. For example, RAM memory can be accessed in any random order, all with a constant response time. By contrast, memory device technologies that require physical movement such as magnetic discs, tapes, and optical discs, have a variable response times as the physical movement can take longer than the data transfer, but often these devices can store larger volumes of data in a reliable manner, long-term manner.

Each type of computer storage system is constructed, and hence operates, in accordance with one or more storage standards. For instance, computer storage systems may operate in accordance with one or more standards including, but not limited to network file system (NFS), flash file system (FFS), disk file system (DFS), small computer system interface (SCSI), internet small computer system interface (iSCSI), file transfer protocol (FTP), and web-based distributed authoring and versioning (WebDAV). An operating systems (OS) and storage standard may specify the data storage format and interface between the processing subsystem and the memory devices. The interface may specify a structure, such as directories and files. Typically, a memory controller provides an interface function between the processing function and memory devices. As new storage systems are developed, the memory controller functional requirements may change to adapt to new standards.

Memory devices are subject to failure and will eventually fail, especially those memory devices that utilize technologies that require physical movement, like a disc drive. For example, it is not uncommon for a disc drive to suffer from bit level corruption on a regular basis, or suffer from a complete drive failure after an average of three years of use. One common solution is to utilize more costly disc drives that have higher quality internal components. Another solution is to utilize multiple levels of redundant disc drives to abate these issues by replicating the data into two or more copies. One such redundant drive approach is called redundant array of independent discs (RAID). Multiple physical discs comprise an array where parity data is added to the original data before storing the data across the array. The parity is calculated such that the failure of one or more discs will not result in the loss of the original data. The original data can be reconstructed from the other working discs if one or more discs fails. RAID 5 uses three or more discs to protect data from the failure of any one disc. The parity and redundancy overhead reduces the capacity of what three independent discs can store by one third (n−1=3−2=2 discs of capacity using 3 discs). RAID 6 can recover from a loss of two discs and requires a minimum of four discs with an efficiency of n−2. Typical RAID systems utilize a RAID control to encode and decode the data across the array.

The drawbacks of the RAID approach include effectiveness, efficiency, and security. As more discs are added, the probability of one or two discs failing rises and is not negligible, especially if the more-desirable and less-costly discs are used. When one disc fails, it should be immediately replaced and the data reconstructed before a second drive fails, whereby data full recover is no longer an option. To provide high reliability over a long time period, it is also common to mirror RAID arrays at different physical locations, especially if the RAID array is part of a national level computing system with occasional site outages. Unauthorized file access becomes a more acute problem when whole copies of the same file are replicated in many locations/geographies, either on just one storage system site or at two or more sites. In light of the effectiveness, the efficiency of dedicating 1 to 2 discs per array for the RAID data-recovery overhead is an issue.

Therefore, a need exists to provide a data storage solution that provides more effective timeless continuity of data, minimizes adverse affects of multiple memory elements failures, provides improved security, can be adapted to a wide variety of storage system standards and is compatible with current and anticipated computing and communications systems.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

DETAILED DESCRIPTION OF THE INVENTION

Figure 1:
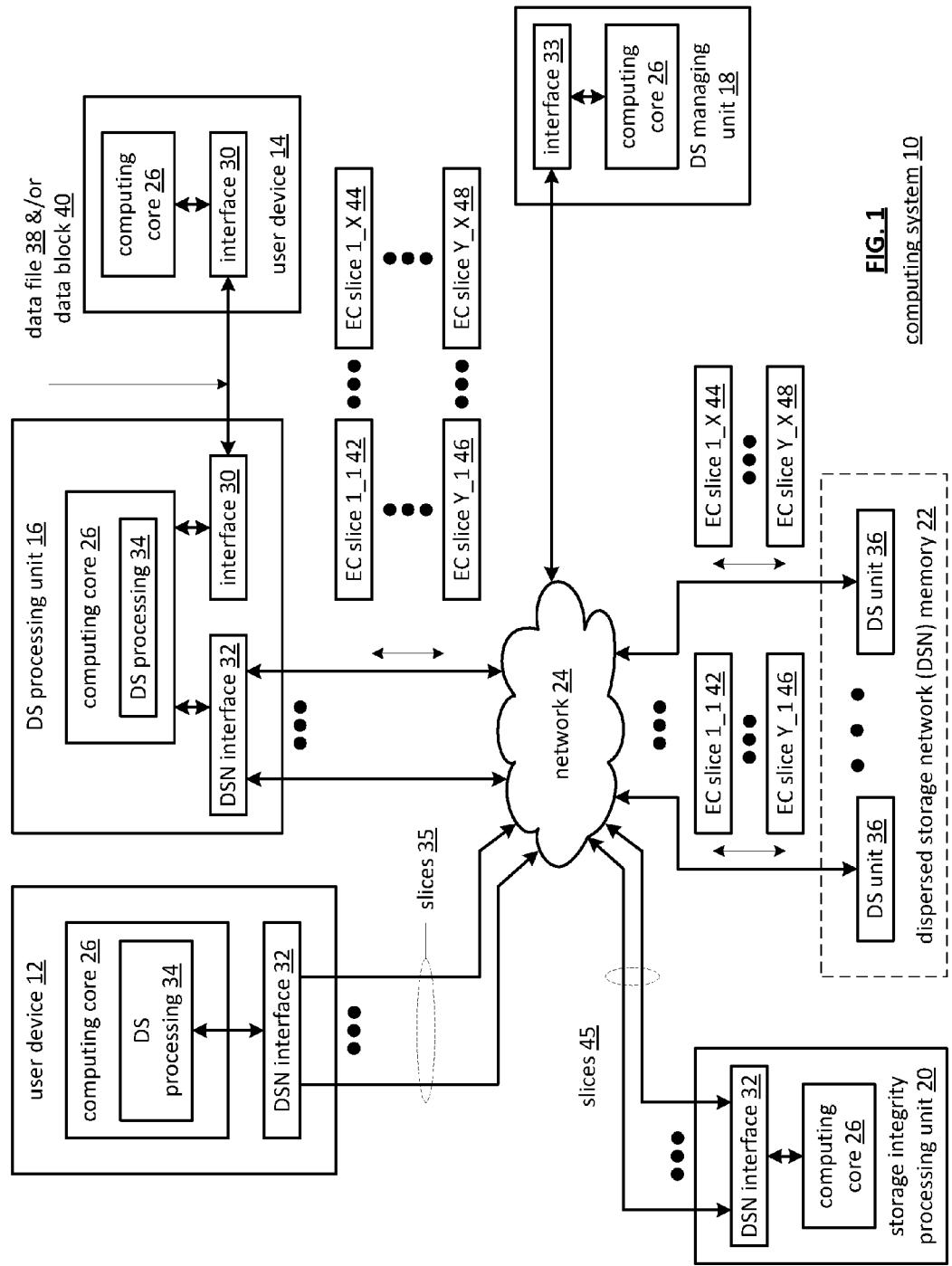
FIG. 1 is a schematic block diagram of an embodiment of a computing system in accordance with the invention.

FIG. 1 is a schematic block diagram of a computing system 10 that includes one or more of a first type of user device(s) 12, one or more of a second type of user device(s) 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire-lined communication systems, including one or more private intranet systems and/or public internet systems; and/or one or more local area networks (LAN) and/or wide area networks (WAN).

The DSN memory 22 includes a plurality of distributed storage (DS) units 36 for storing data for the system. Each of the DS units 36 includes a processing module and memory and may be located at a geographically different site than the other DS units (e.g., one in Chicago, one in Milwaukee, one in Tokyo, one in Paris, etc.). The processing module may be a single processing device or a plurality of processing devices. Such a processing device may be a microprocessor, microcontroller, graphics processing unit, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital or computer information. Note that if the processing module includes more than one processing device, the processing devices may be centrally located (e.g., directly coupled together via a wired and/or wireless bus structure) or may be located in a distributed fashion (e.g., cloud computing via indirect coupling via a local area network and/or a wide area network, peer-to-peer, etc.). Further note that when the processing module implements one or more of its functions via a state machine, analog circuitry, digital circuitry, and/or logic circuitry, the memory and/or memory element(s) storing the corresponding operational instructions may be embedded within, or external to, the circuitry comprising the state machine, analog circuitry, digital circuitry, and/or logic circuitry. Still further note that the memory element stores, and the processing module executes, hard-coded and/or operational instructions corresponding to at least some of the steps and/or functions illustrated in FIGS. 1-12.

Each of the user devices 12-14, the DS processing unit 16, the DS managing unit 18, and the storage integrity processing unit 20 may be a portable computing device (e.g., one or more of a social networking device, a gaming device, a cell phone, a tablet, a netbook, a smart phone, a personal digital assistant, a digital music player, a digital video player, a laptop computer, a handheld computer, a video game controller, and/or any other portable device that includes a computing core) and/or a fixed computing device (e.g., one or more of a personal computer, a workstation, a computer server, a cable set-top box, a satellite receiver, a television set, a printer, a fax machine, home entertainment equipment, automotive entertainment device, industrial controls, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30-33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be stored in a distributed manner in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of valid slices required to reconstruct the full and originally-stored data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating, software upgrades, more memory, etc.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error-coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment in the Y data segments. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and stored in a distributed manner at physically diverse locations to improved data storage integrity and security. Further examples of encoding the data segments will be provided with reference to one or more of FIGS. 2-12.

Each DS unit 36 that receives a slice 42-48 for storage translates the virtual DSN memory address of the slice into a local physical address for storage. Accordingly, each DS unit 36 maintains a virtual-to-physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device 14 is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error-coding scheme. The storage integrity processing unit 20 stores the rebuild slice, or slices, in the appropriate DS unit(s) 36 in a manner that mimics the write process previously described.

Figure 2:
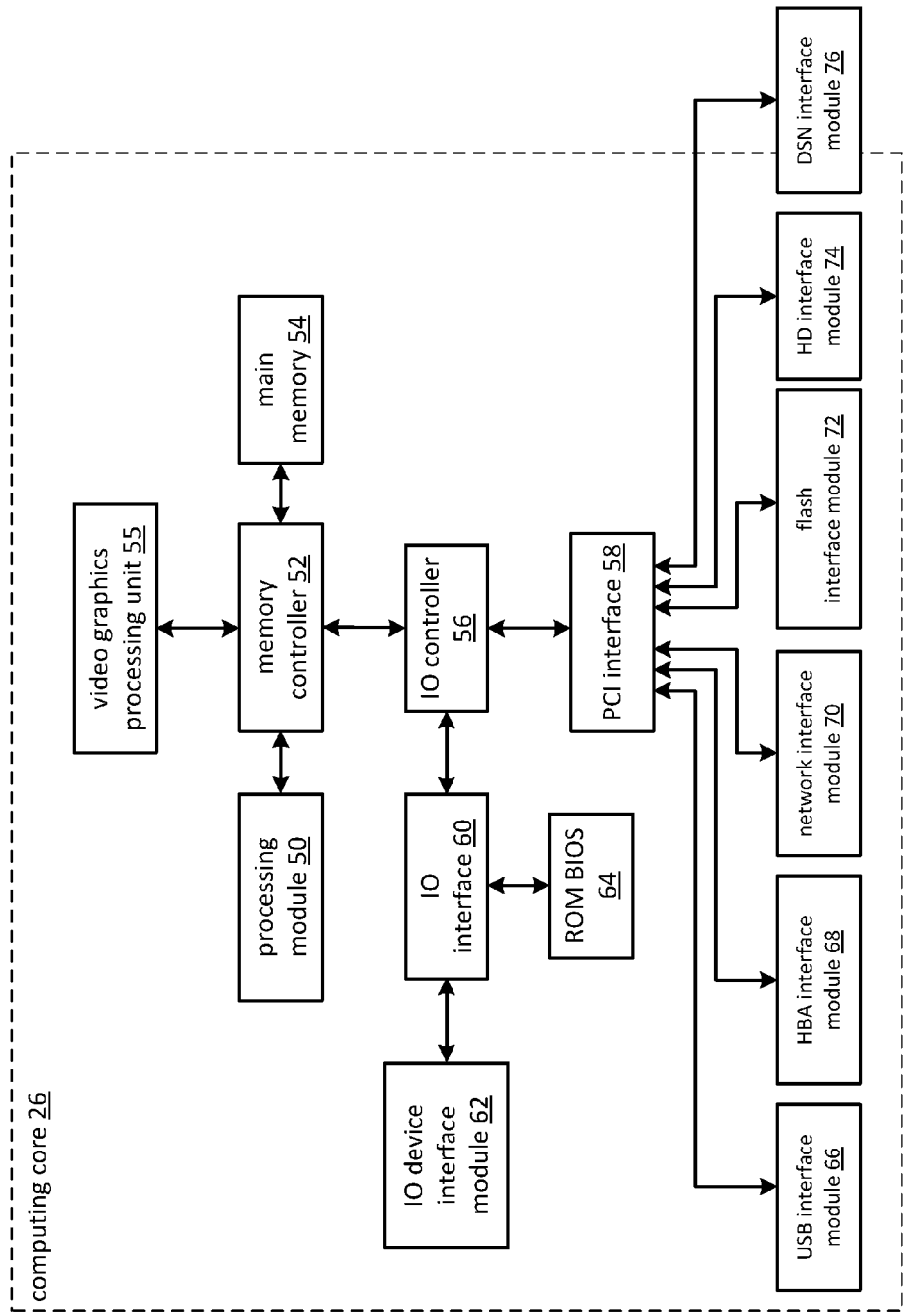
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface (or another type of interface) 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be located in a distributed manner (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-12.

Figure 3:
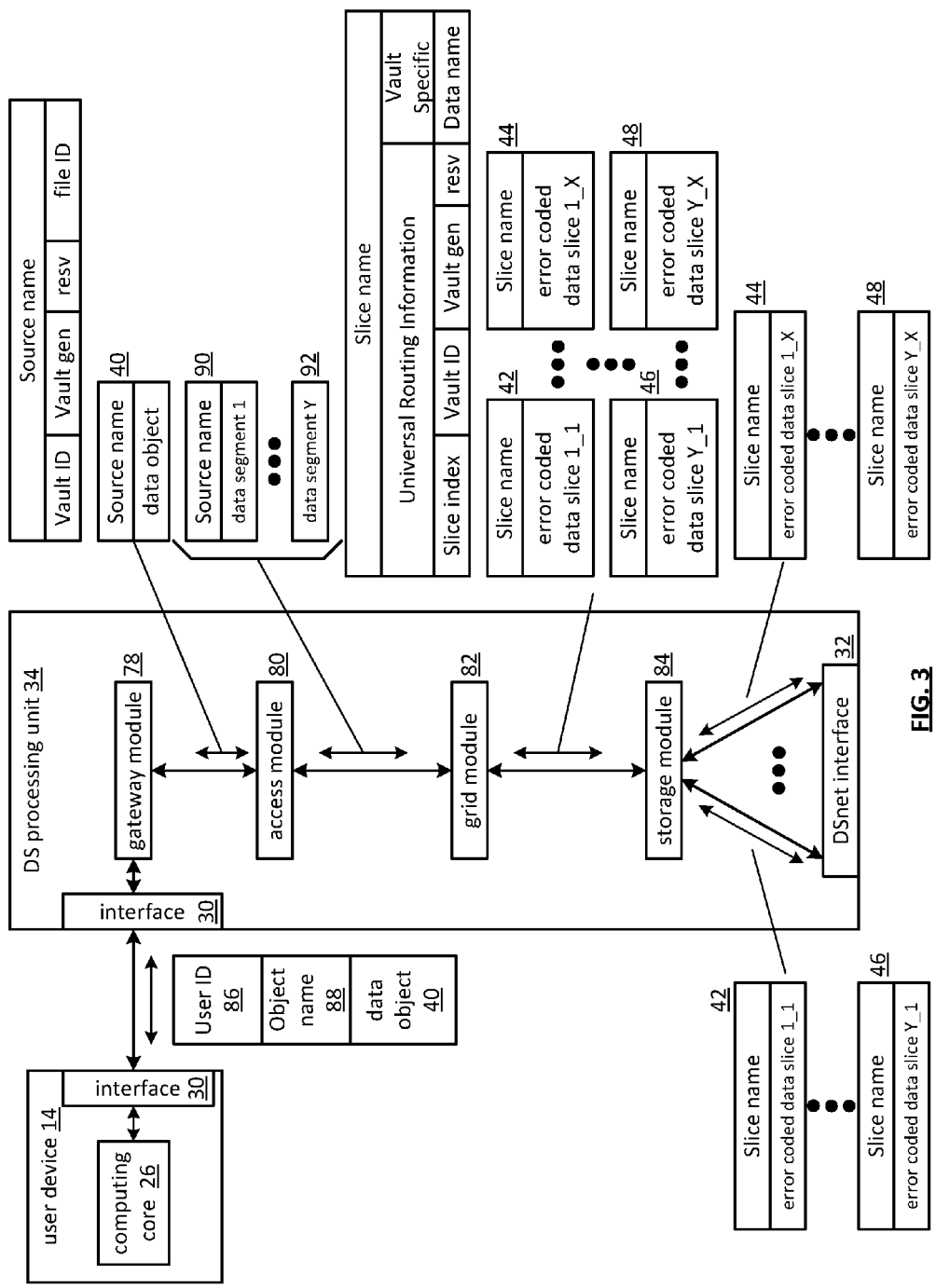
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 and/or the interfaces may be part of user 12 or of the DS processing unit 14. The DS processing module 34 may further include a bypass/feedback path between the storage module 84 and the gateway module 78.

In an example of storing data in one embodiment, the gateway module 78 receives an incoming data object (e.g., a data file, a data block, an EC data slice, etc.) that includes a user ID field 86, an object name field 88, and the data field/object 40. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.) as shown in FIG. 3. A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module uses the user information to assign a source name to the data. For instance, the gateway module 60 determines the source name of the data object 40 based on the vault identifier and the data object. For example, the source name may contain a data name (block number or a file number), the vault generation (gen) number, the reserved field (resv), an optional file ID, and the vault identifier (ID). The data name may be randomly assigned but is associated with the user data object 40.

The access module 80 receives the data object 40 and creates a series of data segments 1 through Y 90-92 therefrom. The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 82 may pre-manipulate (e.g., compression, encryption, cyclic redundancy check (CRC), etc.) each of the data segments before performing an error coding function of the error coding dispersal storage function to produce a pre-manipulated data segment. The grid module 82 then error encodes (e.g., Reed-Solomon, Convolution encoding, Trellis encoding, etc.) the data segment or pre-manipulated data segment into X error coded data slices 42-44. The grid module 82 determines a unique slice name for each error coded data slice and attaches it to the data slice.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that in some embodiments the write threshold is greater than or equal to the read threshold for a given number of pillars (X).

The grid module 82 also determines which of the DS storage units 36 will store the EC data slices based on a dispersed storage memory mapping associated with the user's vault and/or DS storage unit 36 attributes. The DS storage unit attributes includes availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the EC data slices and, when successful, transmits the EC data slices 1 through X of each segment 1 through Y to the DS Storage units. Each of the DS storage units 36 stores its EC data slice and keeps a table to convert the virtual DSN address of the EC data slice into physical storage addresses.

In an example of a read operation, the user device 12 and/or 14 sends a read request to the DS processing unit 34, which authenticates the request. When the request is authentic, the DS processing unit 34 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-data manipulator 75, an encoder 77, a slicer 79, a post-data manipulator 81, a pre-data de-manipulator 83, a decoder 85, a de-slicer 87, and/or a post-data de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-data manipulator 75 receives a data segment 90-92 and a write instruction from an authorized user device. The pre-data manipulator 75 determines if pre-manipulation of the data segment 90-92 is required and, if so, what type. The pre-data manipulator 75 may make the determination independently or based on instructions from the control unit 73, where the determination is based a computing system-wide predetermination, a table lookup, vault parameters associated with the user identification, the type of data, security requirements, available DSN memory, performance requirements, and/or other metadata.

Once a positive determination is made, the pre-data manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of $d*(X/T)$, where d is size of the data segment 92, X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer slices each encoded data segment 94 into 16 encoded slices.

The post-data manipulator 81 performs, if enabled, post-manipulation on the encoded slices to produce the EC data slices. If enabled, the post-data manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-data manipulation may include slice level compression, signatures, encryption, CRC, addressing, watermarking, tagging, adding metadata, and/or other manipulation to improve the effectiveness of the computing system.

In an example of a read operation, the post-data de-manipulator 89 receives at least a read threshold number of EC data slices and performs the inverse function of the post-data manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-data de-manipulator 83 performs the inverse function of the pre-data manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
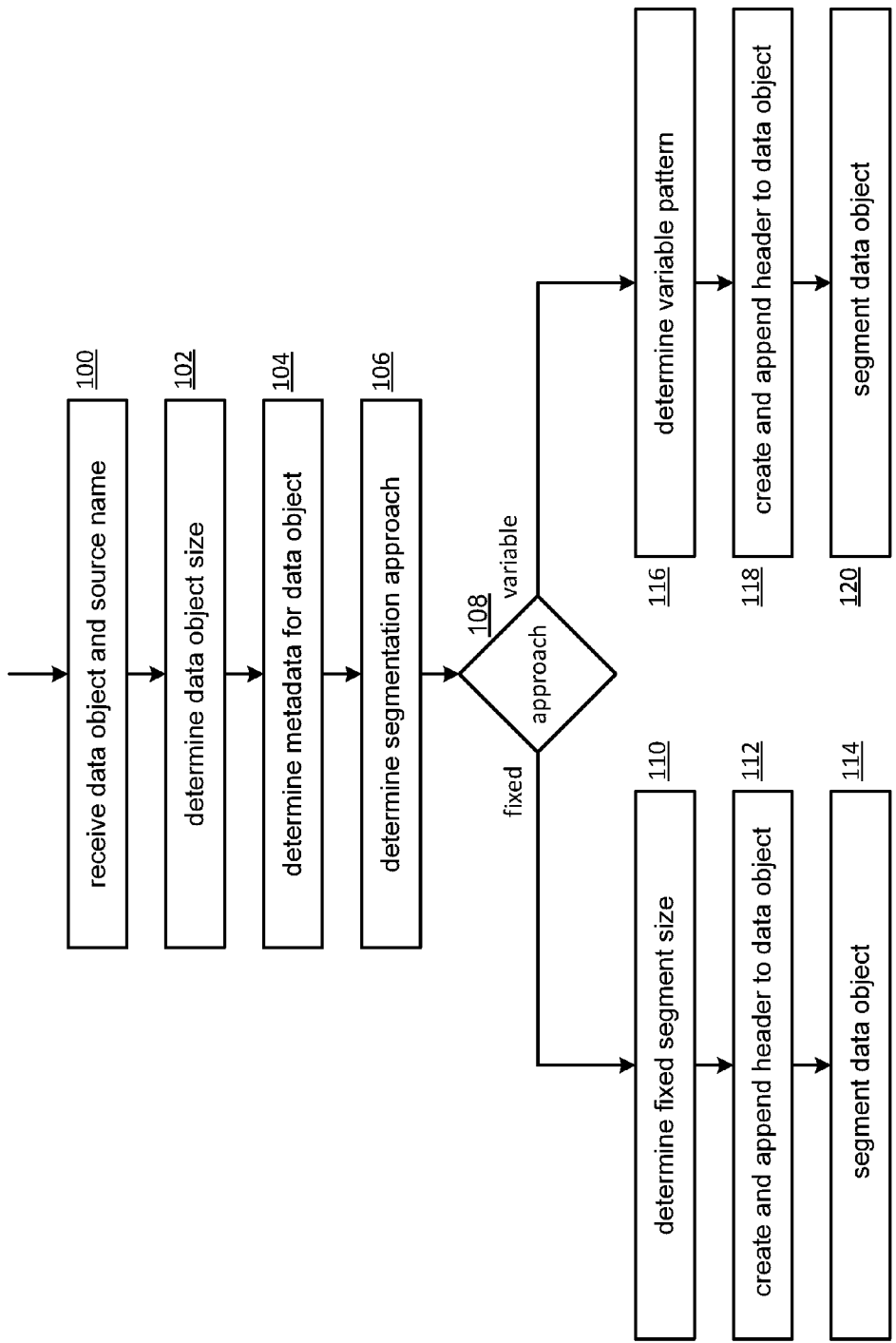
FIG. 6 is a flowchart illustrating the segmentation of data in the system(s) taught herein.

FIG. 6 is a flowchart illustrating the segmentation of data where the access module 80 of the DS processing system may receive a data object 40, determine how to perform segmentation, and segment the data object 40 into data segments in accordance with the segmentation determination made by the access module 80.

The method begins with the step 100 where the access module 80 of FIG. 3 receives a data object 40 (also shown in FIG. 3) and associated source name from the gateway module 78 or any other module of the system. The access module 80 determines the size in bytes (or some other quanta) of the data object 40 where the determination is based on incoming metadata, counting the data object bytes when all the data object bytes have been received, and/or some other algorithmic method, via a step 102. The size determination can be made dynamically as the data object is received by the access module 80, or the size determination can be made after the full receipt of the data object 40 is complete within (or associated with) access module 60

The access module 80 may determine or associate metadata for the data object where the metadata may include one or more of the data object size, a data type indicator, a priority indicator, a security indicator, and/or a user ID, via a step 104. This determination may be based on one or more of received information appended to the data object, a lookup, a command, a predetermination, data object inspection, and/or a user vault entry.

The access module 80 determines a segmentation approach where the approach may include segmenting the data object 40 into equally sized fixed data segments 90-92 or segmenting the data object into variable sized data segments 90-92 via steps 106, 108, 110, and/or 116. The determination may be based on one or more of the metadata, a system loading indicator, received information appended to the data object, a lookup, a command, a predetermination, data object inspection, and/or a user vault entry. For example, the access module 80 may choose the fixed-segment-size approach when the system loading indicator indicates light system loading or if the loading history indicates relatively steady loading. In another example, the access module 80 may choose the variable approach when the system loading indicator indicates currently heavy system loading such that the incremental load (e.g., of storing the data object) may not adversely affect the system loading. Note that fixed data segments may be substantially close in size but not identical in size. For example, if a 102 unit object was determined to be split into 4 fixed or equal parts, the parts would likely be of sizes 25, 25, 26, and 26 units. This is the case because the whole does not divide into equal fixed segments. Also, some segments may be appended with header or other metadata that leads one segment to be slightly larger than others. Therefore, when using the term "fixed" herein, the size may be slightly carrying from segment to segment.

The access module 80 determines a fixed segment size when the access module 80 determines the segmentation approach of segmenting the data object into equally-sized fixed data segments, via steps 106, 108, and 110 in FIG. 6. The determination may be based on one or more of the metadata, a system loading indicator, received information appended to the data object, a lookup, a command, a predetermination, data object inspection, and/or a user vault entry. For example, the access module 80 may choose a smaller fixed segment size when the system loading indicator indicates the system is loading is heavier than average and choosing smaller segment size will create less incremental loading than larger segments.

The access module 80 creates a header and appends the header to the data object 40 per a step 112. In another embodiment, the access module 80 appends the header to two or more (e.g., as many as all) of the data segments 90-92 per the step 112. The header may include one or more of the data object size, the metadata, the fixed data segment size, and/or the data segmentation approach.

The access module 80 segments the data object 40 in accordance with the data segmentation approach and the determined data segment sizes in the step 114 and sends the segments for further processing by the grid module 82 of FIG. 3.

The access module 80 determines or selects a variable pattern when the access module 80 determines the segmentation approach of segmenting the data object into variable sized data segments, via steps 106, 108, and 116 in FIG. 6. The variable pattern may be static, random, pseudo-random, cyclical, or dynamic (e.g., the pattern may change to another pattern over time or as a function of instantaneous system loading). As examples, the variable pattern may start with smaller segment sizes and ramp upwards in size over time. The variable pattern may start with larger segment sizes and ramp downwards in size over time. The variable pattern may alternate between larger segment sizes and smaller segment sizes over time. The variable pattern may vary sinusoidally or via some other function over time or size. The variable pattern determination may be based on one or more of the metadata, a system loading indicator, received information appended to the data object, a lookup, a command, a predetermination, data object inspection, and/or a user vault entry. For example, the access module 80 may choose a smaller fixed segment size to start with and ramp upwards over time when the system loading indicator indicates the system is loading is heavier than average and choosing smaller segment size when that choice will create less incremental loading than larger segments.

The access module 80 creates a header and appends the header to the data object in the step 118. In another embodiment, the access module 80 appends the header to two or more (e.g., as many as all) data segments in the step 118. The header may include one or more of the data object size, the metadata, the data segmentation approach, and/or the variable pattern.

The access module segments the data object in accordance with the data segmentation approach and the determined variable pattern in the step 120 and sends the segments for further processing by the grid module 82 of FIG. 3.

Note that the same general computing structure taught herein for enabling functions and modules via input and output interface circuitry coupled to a central processing unit or like one or more processing modules may be used to enable operation of the access module 80 in whole or in part. In other forms, these teachings herein can be used to enable the entire DS processing unit 34, of which the access module may only use a portion of the overall compute and memory capability of the larger unit 34. Often the central processing unit or one or more processing modules are coupled to one or more forms of memory devices such as static random access memory, dynamic random access memory, non-volatile memory, cache memory, hard drives, optical storage, or other memory.

Figure 7:
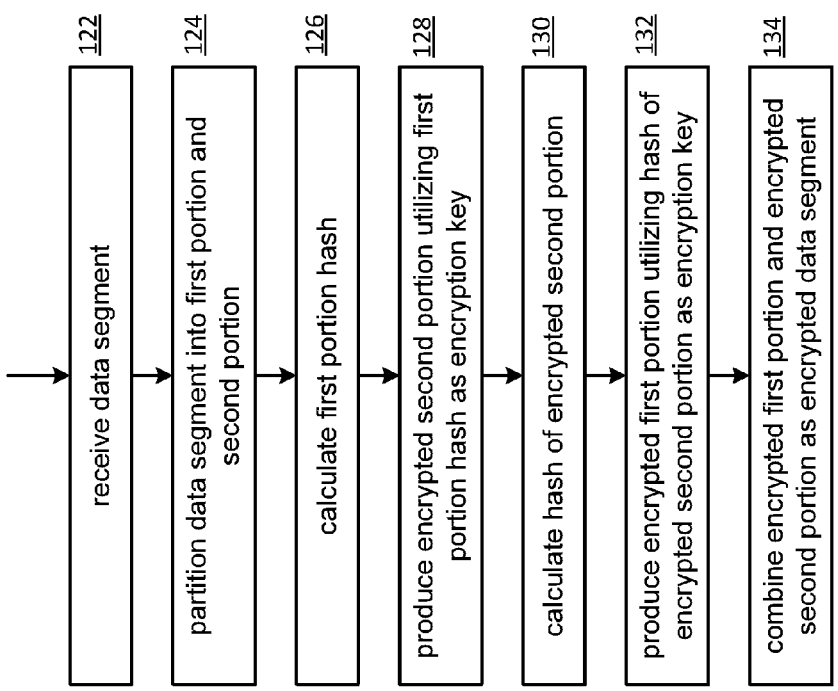
FIG. 7 is a flowchart illustrating the encryption of data in the system(s) taught herein.

FIG. 7 is a flowchart illustrating the encryption of data where the grid module 82 (see FIG. 3) of the DS processing system receives a data segment 90-92 and encrypts the data segment 90-92 prior to encoding and slicing each data segment to produce EC data slices 42-48 with improved security. In particular, the grid module 82 may contain a pre-data manipulator that may encrypt the data segment as taught herein.

The method begins with the step 122 where the grid module 82 receives one or more data segments 90-92 from the access module 80 or any other module within the system. The grid module 82 partitions the data segment 90 or 92 into a first portion and second portion where the portions may be the same or different sizes via a step 124. In another embodiment, the grid module may partition the data segment 90 or 92 into more than two portions to obtain N portions where N is a finite integer greater than two. These N portions may be of equal sizes (or nearly equal if the segment does not divide evenly) or different sizes. In yet another embodiment, the grid module 82 partitions the data segment 90 or 92 into two or more portions with equal or non-equal sizes based on a partitioning determination. The grid module 82 may determine the partitioning based on a security procedure, a security indicator, data object metadata, a system loading indicator, received information appended to the data object, a lookup, a command, a predetermination, data object inspection, and/or a user vault entry. For example, the security procedure may indicate that the portion sizes will change with every data segment by 5%. In other words, the first portion may grow by 5% and the second portion may shrink by 5% for the next data segment, until the first portion is 100% and the second portion is 0% in which case the security procedure may reverse the process. In another example, even numbered data segments may be partitioned into a 75% first portion and a 25% second portion while odd numbered data segments may be partitioned into a 15% first portion and an 85% second portion.

Basically, any function over time or any other variable may be applied to the partitioning scheme so long as the sending and receiving end are aware of the scheme so that encryption and decryption may commence accurately. The function applied may also appear random. Meaning, the sending and receiving end may each contain signature analyzers that are synced to each other, whereby the value of the signature analyzer determines the size or fractional size of first and second segments. For example, if a signature analyzer sequence with a max value of 100 cycles through the following sequence: 74, 12, 32, 89, 54, then the first segment may be set to contain 74% of the total data, 12% of the data, 32% of the data and so on whereby the second segment contains the remainder of the data.

The grid module calculates a first portion hash value for the first portion in a step 126. The hash function type may be stored in the user vault taught herein and associated with the data segment, slice, or file being processed.

The grid module 82 may determine a first encryption algorithm based on one or more of a user vault entry, a predetermination, a command, and/or a table lookup utilizing the first portion hash as an index. In a step 128, the grid module 82 then produces an encrypted second portion by encrypting the second portion utilizing the first encryption algorithm and an encryption key where the encryption key is based in whole or in part on the hash value of the first portion. For example, the encryption key may be equal to the first portion hash. In another example, the encryption key may be a combination of the first portion hash and a second number (e.g. a stored value from the user vault, a calculated value) or may be the first portion hash placed through further processing.

The grid module then calculates a hash of the encrypted second portion via a step 130. The hash function type may be stored in the user vault associated with the data segment. The hash operations for the two segments may be the same or different.

The grid module 82 may determine a second encryption algorithm based on one or more of a user vault entry, a predetermination, a command, and/or a table lookup utilizing the hash of the encrypted second portion as an index per a step 132. The second encryption algorithm may be the same or different than the first encryption algorithm. The grid module 82 then produces an encrypted first portion by encrypting the first portion utilizing the second encryption algorithm and an encryption key where the encryption key is based in whole or in part on the hash of the encrypted second portion. For example, the encryption key may be equal to the hash of the encrypted second portion. In another example, the encryption key may be a combination of the hash of the encrypted second portion and a second number (e.g. a stored value from the user vault, a calculated value) or post-processed in a similar manner to the first portion hash.

The grid module 82 then combines the encrypted first portion and the encrypted second portion to produce an encrypted data segment in a step 134. Note that an improvement of the method includes providing security with efficiency where the size of the encrypted data segment is equal to the size of the encrypted first portion summed with the size of the encrypted second portion (e.g., no extra bits). Note that security is provided since the decryption method must be known to decrypt the encrypted data segment. The method of decryption is discussed in greater detail with reference to FIG. 8 below.

Furthermore, the segmentation and encryption algorithms taught herein can be applied to the segments through repeated application. Specifically, if there are N partitions or portions, then the algorithm may be run through the partitions or portion up to N times to ensure an all or nothing property (AONT) for the decryption operation. Without this process, if a hacker gains half the data, and part of the other partitioning (e.g., in a two way split) then some data can be yielded. However, if after the steps of encrypting the latter half with the hash of the former half, and encrypted the former half with the hash of the latter, the process then encrypts the latter half (again) with the hash of the encrypted former half, then the process has ensured a true AONT, meaning that short of even 1 bit, the decryption process won't be able decrypt any part of the encrypted data, since one would need all of the former half and all of the latter half to do so.

Figure 8:
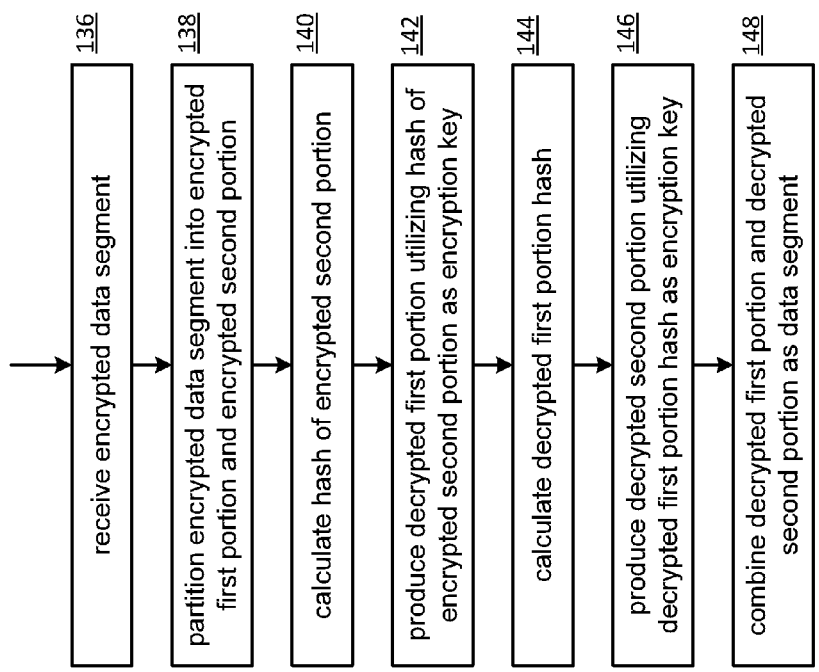
FIG. 8 is a flowchart illustrating the decryption of data in the system(s) taught herein.

Also, the cipher mode taught with respect to FIGS. 7-8 may in one embodiment not cause any additional expansion or padding of the message/data. Such methods include Counter Mode (CTR), Output Feedback Mode (OFB), Cipher Feedback Mode (CFB), or a stream cipher.

FIG. 8 is a flowchart illustrating the decryption of data where the grid module 82 of the DS processing system recreates an encrypted data segment (e.g. by retrieving EC data slices, de-slicing the slices, and decoding the slices) and decrypts the encrypted data segment to produce a recreated decrypted data segment. In particular, the grid module's pre-data de-manipulator may decrypt the data segment.

The method begins with the step 136 wherein the grid module's pre-data de-manipulator receives an encrypted data segment from the grid module decoder or any other module within the distributed network storage system. The grid module 82 partitions the encrypted data segment into an encrypted first portion and an encrypted second portion in a step 138 where the portions may be the same or different sizes. In another embodiment, the grid module partitions the encrypted data segment into more than two portions. In yet another embodiment, the grid module partitions the encrypted data segment into two or more portions with equal or non-equal sizes based on a partitioning determination (e.g., the same as the encryption portioning determination) that results in N partitions where N is a finite integer greater than two. The grid module may determine the partitioning based on a security procedure, a security indicator, data object metadata, a system loading indicator, received information appended to the data object, a lookup, a command, a predetermination, data object inspection, and/or a user vault entry. For example, the security procedure may indicate that the portion sizes will change with every data segment by 5%. In other words, the first portion may grow by 5% and the second portion may shrink by 5% for the next data segment, until the first portion is 100% and the second portion is 0% in which case the security procedure may reverse the process. In another example, even numbered encrypted data segments may be partitioned into a 75% encrypted first portion and a 25% encrypted second portion while odd numbered data segments may be partitioned into a 15% encrypted first portion and a 85% encrypted second portion. However, the partitioning performed by the decryptor is a function of (or is identical to) the encryption partitioning used when encrypting this data segment or data object. Also, the encryption and decryption segmentation parameters may be set by data segment, data object, data file, user, geographic location, address space, or some other parameter.

The grid module 82 then calculates a hash of the encrypted second portion in a step 140. The hash function type may be stored in the user vault associated with the data segment.

The grid module 82 may then determine a second decryption algorithm based on one or more of a user vault entry, a predetermination, a command, and/or a table lookup utilizing the hash of the encrypted second portion as an index. However, the decryption algorithm must be compatible with the original encryption operation (see FIG. 7). The grid module 82 produces a decrypted first portion by decrypting the encrypted first portion utilizing the second decryption algorithm and an encryption key where the encryption key is based in whole or in part on the hash of the encrypted second portion via a step 142. As an example, the encryption key may be equal to the hash of the encrypted second portion. In another example, the encryption key may be a combination of the hash of the encrypted second portion and a second number (e.g. a stored value from the user vault, a calculated value). In other embodiments, the hash value is placed through algorithmic processing of some sort to derive the encryption key used herein.

The grid module 82 then calculates a decrypted first portion hash by performing a hash on the decrypted first portion via a step 144. The hash function type may be stored in the user vault associated with the data segment.

The grid module 82 may determine a first decryption algorithm based on one or more of a user vault entry, a predetermination, a command, and/or a table lookup utilizing the decrypted first portion hash as an index. Again, the encryption and decryption operations should be compatible. However, the first decryption algorithm may be the same or different than the second decryption algorithm. The grid module 82 produces a decrypted second portion by decrypting the second portion utilizing the first encryption algorithm and an encryption key where the encryption key is based in part on the decrypted first portion hash, as shown in step 146. In one example, the encryption key may be equal to the decrypted first portion hash. In another example, the encryption key may be a combination of the decrypted first portion hash and a second number (e.g. a stored value from the user vault, a calculated value).

The grid module 82 combines the decrypted first portion and the decrypted second portion to produce a decrypted data segment in a step 148 of FIG. 8. Note that an improvement of this method includes providing security with efficiency where the size of the encrypted data segment is equal to the size of the encrypted first portion summed with the size of the encrypted second portion (e.g., no extra bits). Note that security is provided where the decryption method must be known to decrypt the encrypted data segment.

Figure 9:
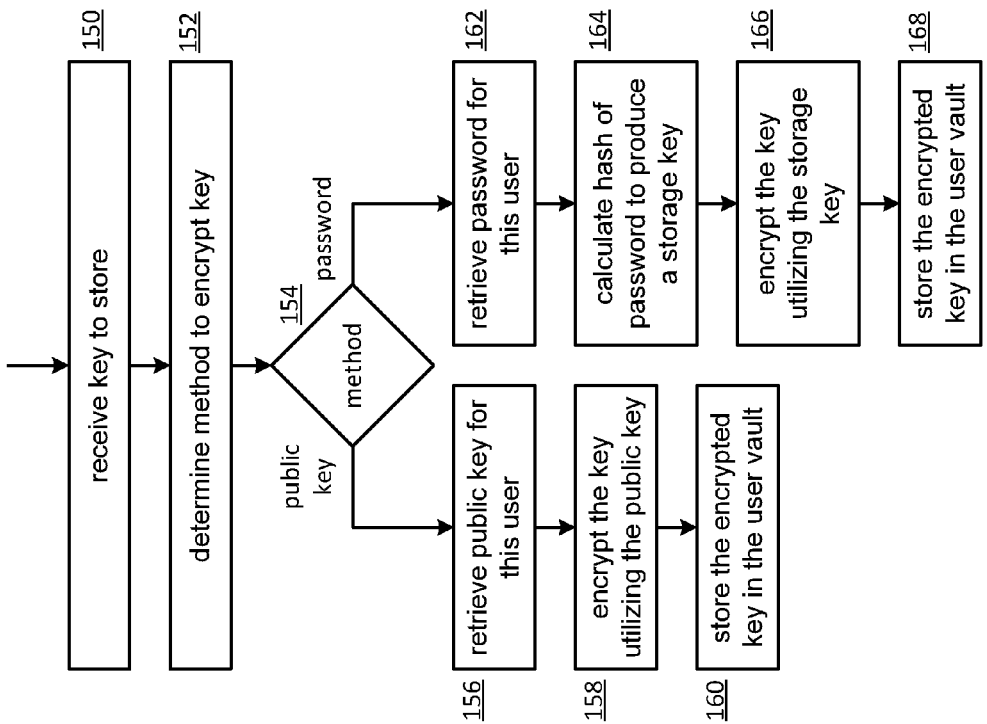
FIG. 9 is a flowchart illustrating the storing of an encryption key in the system(s) taught herein.

FIG. 9 is a flowchart illustrating the storing of an encryption key where the DS managing unit may encrypt the encryption key prior to storing the encryption key.

Note that keys may be utilized to encrypt and/or decode control information and/or data content. For example, a public key may be utilized to encrypt a message from any source to a target destination while a private key may be utilized just by a key owner to decrypt the message for the destination when the message is encrypted utilizing the public key. The system may utilize such public/private key pairs for signing integrity to authenticate units, modules, users, devices, and transactions. In another example, a secret key may be utilized to encrypt and/or decode data content associated with a secret key owner. For example, a secret key may be utilized to encrypt a series of data object data segments prior to encoding, slicing, and storing EC data slices in the DSN memory. The key owner may utilize the same secret key to subsequently decrypt retrieved, de-sliced, and decoded encrypted data segments.

Note that the DS managing unit may enforce permissions such that retrieving and storing keys is controlled based on the user ID, the system element ID, and a permissions list lookup. For example, users may have permissions to retrieve and store their own private, public, and secret keys. In another example, users may have permissions to retrieve public keys. In yet another example, The DS managing unit may have permissions to retrieve and store all keys.

The method begins with the step 150 where the DS managing unit receives a key to store from any other system element. In step 152, the DS managing unit determines an encryption method to encrypt the key to produce an encrypted key. Note that the key may be stored in the DSN memory as EC data slices of the encrypted key to provide improved security.

The encryption methods include a public key method and a password method (the methods will be described below) in step 154. The DS managing unit determines the method to encrypt the key based on one or more of user device connectivity type (e.g., iSCI), a user vault setting, a command, an operational parameter, availability of a public key, and/or availability of a password. For example, the DS managing unit may choose the public key method when the device connectivity type is iSCI (e.g., no password with iSCI).

The DS managing unit retrieves a public key for the user (or unit) when the DS managing unit determines the method to encrypt the key to be the public key method. The DS managing unit may retrieve the public key from the user vault or it may be included with the key to be stored.

The DS managing unit encrypts the key to be stored to produce an encrypted key utilizing the public key and an encryption algorithm based on the operational parameters (e.g., stored in the user vault). The DS managing unit stores the encrypted key in the user vault. The DS managing unit may encode and slice the encrypted key and store the EC data slices in the DSN memory.

The DS managing unit retrieves a password for the user (or unit) in step 156 when the DS managing unit determines the method to encrypt the key to be the password method. The DS managing unit may retrieve the password from the user vault or it may be included with the key to be stored.

The DS managing unit encrypts the key to be stored in step 158 to produce an encrypted key utilizing the public key and an encryption algorithm based on the operational parameters (e.g., stored in the user vault). The DS managing unit stores the encrypted key in the user vault in step 160. The DS managing unit may encode and slice the encrypted key and store the EC data slices in the DSN memory.

The DS managing unit retrieves a password for the user (or unit) in step 162 when the DS managing unit determines the method to encrypt the key to be the password method. The DS managing unit may retrieve the password from the user vault or it may be included with the key to be stored.

The DS managing unit may retrieve a hash algorithm from the user vault. The DS managing unit calculates a hash of the password in step 164 to produce a storage key utilizing the hash algorithm.

The DS managing unit encrypts the key to be stored in step 166 to produce an encrypted key utilizing the storage key and an encryption algorithm based on the operational parameters (e.g., stored in the user vault). The DS managing unit stores the encrypted key in the user vault in step 168. The DS managing unit may encode and slice the encrypted key and store the EC data slices in the DSN memory.

Figure 10:
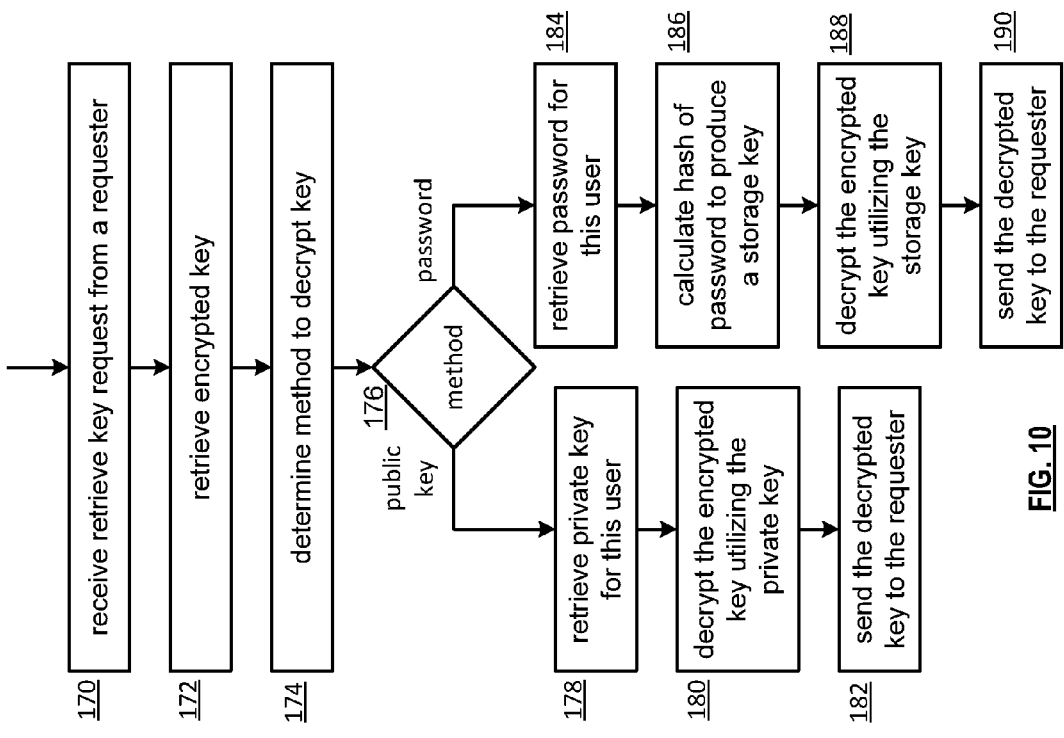
FIG. 10 is a flowchart illustrating the retrieval of an encryption key in the system(s) taught herein.

FIG. 10 is a flowchart illustrating the retrieval of an encryption key where the DS managing unit may retrieve an encrypted key and decrypt the encrypted key to provide a key to a requester.

The method begins with the step 170 where the DS managing unit receives a retrieve key request from a requester (e.g., any system element). Note that the key may be previously stored in the user vault and or DSN memory as an encrypted key as was previously discussed.

The DS managing unit determines the DSN memory and/or user vault location for the associated encrypted key based on one or more of a user ID, the requester ID, a key use indicator, a lookup, a command, a predetermination, and/or an identifier associated with the key. The DS managing unit retrieves the encrypted key based on the location determination in step 172.

The DS managing unit determines a decryption method to decrypt the encrypted key to produce a decrypted key in step 174. Note that the encrypted key may be stored in the DSN memory as EC data slices to provide improved security.

The decryption methods include a public key method and a password method in step 176 (the methods will be described below). The DS managing unit determines the method to decrypt the key based on one or more of user device connectivity type (e.g., iSCI), a user vault setting, a command, an operational parameter, availability of a public key, and/or availability of a password. For example, the DS managing unit may choose the password method when a password is available.

The DS managing unit retrieves a private key for the user (or unit) in step 178 when the DS managing unit determines the method to decrypt the key to be the public key method. The DS managing unit may retrieve the private key from the user vault or it may be included with the key request.

The DS managing unit decrypts the encrypted key in step 180 to produce the decrypted key utilizing the private key and an encryption algorithm based on the operational parameters (e.g., stored in the user vault). The DS managing unit sends the decrypted key to the requester in step 182.

The DS managing unit retrieves a password for the user (or unit) in step 184 when the DS managing unit determines the method to decrypt the key to be the password method. The DS managing unit may retrieve the password from the user vault or it may be included with the key request.

The DS managing unit may retrieve a hash algorithm from the user vault. The DS managing unit calculates a hash of the password in step 186 to produce a storage key utilizing the hash algorithm.

The DS managing unit decrypts the encrypted key in step 188 to produce the decrypted key utilizing the storage key and an encryption algorithm based on the operational parameters (e.g., stored in the user vault). The DS managing unit sends the decrypted key to the requester in step 190.

Figure 11:
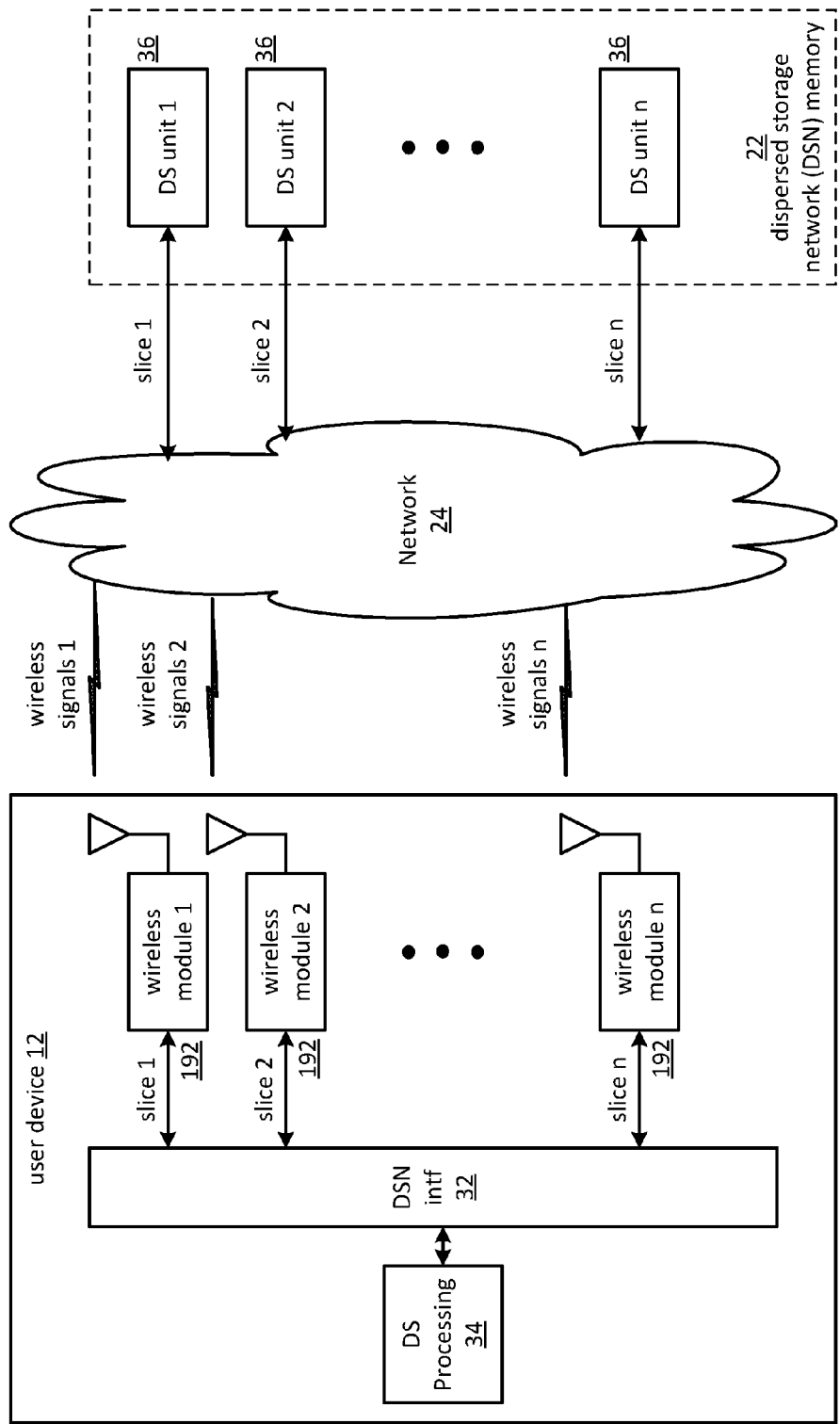
FIG. 11 is a schematic block diagram of another embodiment of a computing system in accordance with the invention.

FIG. 11 is a schematic block diagram of another embodiment of a computing system where a user device 12 may utilize two or more simultaneous wireless connections thru one or a plurality of modules 192 to store and/or retrieve EC data slices to/from the DSN memory associated with DS storage unit(s) 36. Such a system may provide improved performance and security.

The system includes a user device 12, a network 24, and the DSN memory which contains one or more DS units 36. The network 24 may include one or more wireless networks 1 through n to accommodate wireless connections between the user device and the DSN memory. While FIG. 11 shows n wireless signals and n DS units 36, it should be understood that in another embodiment one wireless signal can serve a plurality of DS units 36 or one wireless module may time multiplex or frequency multiplex process multiple of the wireless signals shown in FIG. 11. Therefore, the value of n across all of the modules 192, wireless signals, and DS units 36 need not be equal.

The user device 12 includes the DS processing unit/function 34 (see FIG. 1), the DSN interface 32 (see FIG. 1), and one or more wireless modules 192 (1-n modules where n is a finite positive integer). In an embodiment, the wireless modules 192 may be implemented as n hardware transceivers or fewer than n frequency multiplexed, time multiplexed, or the like. In another embodiment, the wireless modules 1-n may be implemented as n software modules operating on one hardware transceiver (e.g., a software defined radio (SDR)). In yet another embodiment, the wireless modules 1-n may be implemented as n software modules operating on two or more hardware transceivers (e.g., software defined radios).

The wireless module 192 communicates wireless signals with the network 24 and may operate in accordance with one or more wireless industry standards including but not limited to universal mobile telecommunications system (UMTS), global system for mobile communications (GSM), long term evolution (LTE), wideband code division multiplexing (WCDMA), IEEE 802.11, IEEE 802.16, WiMax, Bluetooth, or any other LAN, WAN, PAN or like wireless protocol. Therefore any two, four, or any number of wireless modules in FIG. 12 may be powered by one or more different wireless protocols.

In one embodiment, wireless module 1 communicates (e.g., transmits and receives) wireless signals 1 with the network. In this embodiment, wireless module 2 communicates (e.g., transmits and receives) wireless signals 2 with the network. In general, wireless modules 1-n communicate (e.g., transmits and receives) wireless signals 1-n with the network in this embodiment.

Wireless modules 1-n may utilize the same or different wireless industry standards. For example, wireless module 1 may utilize GSM and wireless module 2 may simultaneously utilize IEEE802.16. Wireless modules 1-n may utilize similar or different performance levels (e.g., speed in bits per second) of the wireless signals 1-n. For example, wireless module 1 may communicate at 100 kilobits per second (Kbps) via wireless signals 1 in accordance with the WCDMA standard and wireless module 2 may simultaneously communicate at 3.3 megabits per second (Mbps) via wireless signals 2 in accordance with IEEE 802.11 standard. In another example, wireless module 1 and wireless module 2 may both utilize the same portion of the network in accordance with the IEEE802.16 standard but operate at different performance levels. For instance, wireless module 1 may communicate at 350 kilobits per second via wireless signals 1 in accordance with the IEEE 802.16 standard and wireless module 2 may simultaneously communicate at 675 kilobits per second via wireless signals 2 in accordance with IEEE 802.16 standard. Since SDR's are possible in some embodiments, such protocols may be changed over time according to a predetermined security algorithm whereby the protocol on one or more wireless channels is changing over time.

The DS processing unit/function 34 determines which of the wireless modules 1-n to utilize to transfer slices to and from the DSN memory. The DS processing unit/function 34 may determine or select two or more simultaneous wireless paths. For example, the DS processing unit/function 34 may determine to utilize wireless module 1 to communicate slice 1 over wireless signal 1, wireless module 2 to communicate slice 2 over wireless signal 2, wireless module 3 to communicate slice 3 over wireless signal 3, etc. and wireless module n to communicate slice n over wireless signal n. In another example, the DS processing may determine to utilize wireless module 1 to communicate slice 1 through slice 10 over wireless signal 1 and wireless module 2 to communicate slice 11 through slice n over wireless signal 2, etc. Therefore, the various wireless channels may communicate different quantities of data over different times or bandwidth availability and may change protocols or encryption techniques in order to improve security.

In an example of operation to illustrate an embodiment method, the DS processing unit/function 34 creates n slices for storage in the DS units 36 of the DSN memory by creating a data segment, encoding the segment, and slicing the encoded segment into data slices. The DS processing unit/function 34 determines performance requirements (e.g., storage and retrieval latencies) and security requirements (e.g., higher or lower level of security) based on user vault information and/or metadata associated with the processed data object 40. The DS processing unit/function 34 determines which wireless modules 192 to utilize to communicate the n slices to the DSN memory. The determination may be based on one or more of the performance requirements, the security requirements, and performance indicators for each or some of the wireless modules 192, and/or security indicators for each of the wireless modules 192. The DS processing unit/function 34 determines a mapping of the n slices to the determined wireless modules 192 where the determination may be based on one or more of the performance requirements, the security requirements, performance indicators for each of the wireless modules 192, and/or security indicators for each of the wireless modules 192. The DS processing unit/function 34 sends the slices with a store command to the DSN memory via the determined wireless modules 192 and the determined mapping of the n slices to the determined wireless modules 192.

In another example of operation to illustrate yet another embodiment/method, the DS processing unit/function 34 retrieves n slices from the various DS unit(s) 36 of the DSN memory in FIG. 11. The DS processing unit/function 34 determines performance requirements (e.g., storage and retrieval latencies) and security requirements (e.g., higher or lower level of security) based on user vault information and/or metadata associated with the data object, or some other method. The DS processing unit/function 34 determines the wireless modules 192 to utilize to retrieve the n slices from the DS unit(s) 36 if the DSN memory. The determination may be based on one or more of the performance requirements, the security requirements, and performance indicators for each of the wireless modules 192, and/or security indicators for each of the wireless modules 192. The DS processing unit/function 34 determines a mapping of the n slices to the determined wireless modules 192 where the determination may be based on one or more of the performance requirements, the security requirements, performance indicators for each of the wireless modules 192n, and/or security indicators for each of the wireless modules 192. The DS processing unit/function 34 sends 192 slice retrieval commands to the DSN memory or individual DS units 26 via the determined wireless modules 192 and the determined mapping of the n slices to the determined wireless modules.

Figure 12:
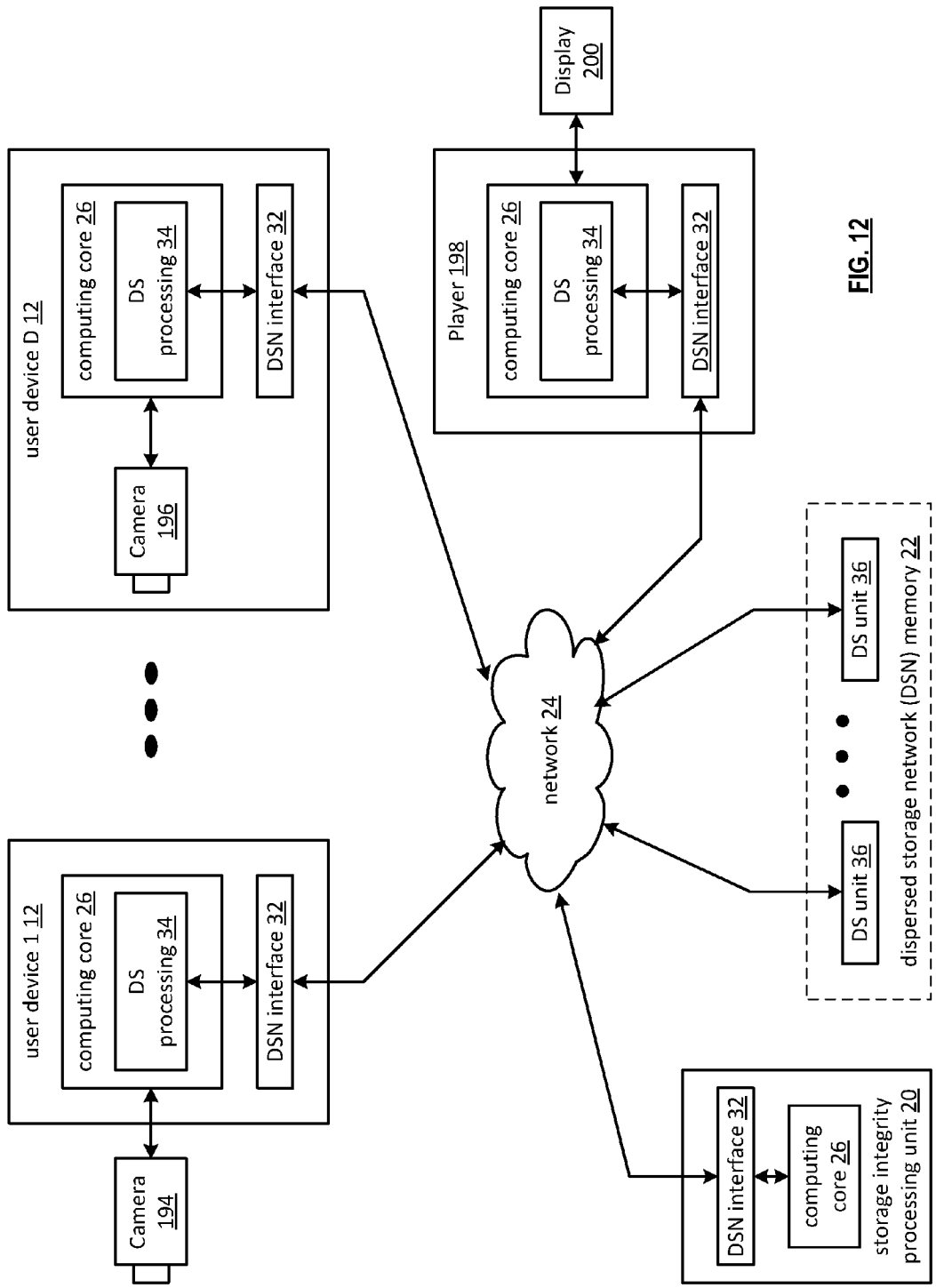
FIG. 12 is a schematic block diagram of another embodiment of a computing system in accordance with the invention.

FIG. 12 is a schematic block diagram of another embodiment of a computing system where error coded (EC) data slices are created and distributed to the DS unit(s) 36 within the DSN memory by one or more user device(s) 12. The EC data slices are video from a video surveillance camera, a television event, stadium camera coverage at a live event (e.g., football or boxing match) or some other stream of video information. The system includes user devices 1-D, the network 24, the storage integrity processing unit 20, the DSN memory, and a player.

In an embodiment, user device 1 includes the computing core 26 (containing or connected to the DS processing unit/function 34) and the DSN interface 32. An external video camera 194 interfaces with the computing core via one of the interfaces discussed with reference to FIG. 2, such as USB, firewire, PCI, wireless connections, or like interfaces. In another embodiment, user device D includes an integrated camera 196, the computing core 22 (along with the associated DS processing unit/function 34), and the DSN interface 32. The internal/integrated video camera also may interface with the computing core 22 via one of the interfaces discussed with reference to FIG. 2. In yet another embodiment, the computing core 22 includes the camera 196 (this configuration is not specifically shown in FIG. 12).

Either or both cameras 194-196 may output standard definition (SD) and/or high definition (HD) video utilizing one of a plurality of video codec or video compression algorithms and may interface with the computing core 22 via an analog and/or digital interface that is wired and/or wireline. The computing core 22 may communicate control and metadata information with their respective cameras 194-196. The control information may include operational instructions including but not limited to the video compression algorithm to utilize, a camera position schedule, pan left, pan right, zoom in, zoom out, change from visible mode to infrared mode, match a pattern, new software load, etc. The metadata information may include a timestamp, location information, pattern recognition information, camera setting information, camera direction, camera type, camera software version, 3D rendering data, depth data, facial recognition flags/alerts or information, internet protocol address, camera ID, etc. The camera 196 may operate in accordance with the control information and send video and metadata to the computing core 22.

The computing core 22 includes the DS processing unit/function 34. The DS processing unit/function 34 may receive the video and metadata from a corresponding one or more cameras 196. The DS processing unit/function 34 determines DSN operational parameters (e.g., number of pillars, encoding method, slicing method, encryption information, and DSN destinations) that are used for transferring and storing camera video. The determination may be based on one or more of an assignment by the DS managing unit, a predetermination, network performance, DSN memory availability, and/or information from the player.

The DS processing unit/function 34 creates EC data slices of the video and metadata based on the DSN operational parameters. The DS processing unit/function 34 sends the EC data slices with a store command via the network to the DSN destinations (e.g., the DSN memory 22, the player 198 for live viewing a local caching, other camera-equipped user devices for caching and processing). The DS processing unit/function 34 may append the operational parameters to the EC data slices such that the player can readily decode the slices and play back the video.

The player 198 includes a DS processing unit/function 34 that is equipped or associated with the computing core 26, the DSN interface 32, and may include an internal or external display(s) 200 to display video. The player DS processing unit/function 34 may receive slices from one or more cameras 196 or DSN memory 22, de-slice and decode the slices in accordance with the operational parameters as taught herein, and route the resulting video to the display(s) 200. The player 198 may further process the video based in part on the metadata to analyze the video (e.g., look for patterns, detect faces, detect objects, detect events, time stamp certain events, etc.). The player 198 may send control information to the camera via the network to improve or change/program the operation of the camera 194 and/or 196.

The storage integrity processing unit 20 may determine when and how slices stored in the DSN memory are to be deleted, where the determination may be based on one or more of video storage age requirements (e.g., evidence/records retention policy), a current timestamp, a stored video timestamp, the metadata, a command, a command from the player, a command from the camera, a predetermination, and/or a DSN memory availability indicator. For example, the storage integrity processing unit 20 may identify slices of video that are greater than seven years old and the video storage requirements specify seven years. Or, usage data of the video may show that nobody has accessed the video in a threshold amount of time or at a rate that warrants retention. In these events, the storage integrity processing unit 20 sends a delete command to the DSN memory for the determined slices to be deleted, or at least removed from functional memory and sent to backup storage (like tape files or archival disks).

The storage integrity processing unit 20 may determine slices representing video stored in the DSN memory that are to be retrieved, decoded, recompressed, etc., with different video compression algorithms or encodes and may store those new files to the DSN memory 22. The determination for this processing may be based on one or more of video storage age requirements (e.g., evidence/records retention policy), a current timestamp, a stored video timestamp, type of usage, frequency of usage, the metadata, a command, a command from the player, a command from the camera, a predetermination, and/or a DSN memory availability indicator. For example, the storage integrity processing unit 20 may identify slices of video that are the oldest or least used/accessed and the DSN memory availability indicator may indicate a shortage of memory whereby these files need to be compressed, reduced in quality, removed, etc.

In these cases, the storage integrity processing unit 20 sends a retrieve command to the DSN memory 22 for the determined slices to be recompressed. The storage integrity processing unit 20 receives the slices, de-slices and decodes the slices to produce the video in accordance with the operational parameters. The storage integrity processing unit 20 also determines a new video compression algorithm based on the metadata, a command, a command from the player, a vault lookup, usage patterns, usage frequency, usage quantity, time accessed, a command from the camera, a predetermination, and/or a DSN memory availability indicator. The storage integrity processing unit 20 recompresses the video with a new video compression algorithm that will provide an improvement in memory availability or utilization (e.g., utilize less DSN memory space or free up more accessible or faster space for content that can be processed or delivered faster).

The storage integrity processing unit 20 determines the new DSN operational parameters to create slices from the recompressed video based on the metadata, a command, a command from the player, a vault lookup, a command from the camera, a predetermination, and/or a DSN memory availability indicator or other parameters taught herein. The storage integrity processing unit 20 encodes and slices the recompressed video in accordance with the new DSN operational parameters to produce new slices. The storage integrity processing unit sends the new slices with a store command to the DSN memory to store the new data slices. Note, the cameras taught in FIG. 12 may be any camera that captures any kind of image in any kind of format or spectrum. So, cameras 196 may be any sensing device, such as video cameras, professional film cameras. 3D cameras, embedded low cost laptop cameras, security cameras, scientific cameras that capture other spectrums (infrared, gamma ray, ultraviolet, microwave, etc.), night spectrum cameras, heat sensors, simple motion detectors, thermometers, microphones, or any other camera or combination of devices that track audio and/or visual data, spectrum data, or changes in such data over time. The system taught in FIG. 12 allows real time or near real time information to be processed and sent using the segment and slice storage and security methodology taught herein. Near real time generally means any processing done within a few seconds to a few minutes of the capture of the real time data. However, if the case of scientific data, as in transmission from satellite or space bound objects, the time may take longer. Audio/visual information as used herein means any data or information that contains one or both of audio or visual information.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Furthermore, the system taught herein may be referred to either as dispersed storage network or distributed storage networks.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof

What is claimed is:

1. A method for processing a data segment within a portion of a distributed storage network, the method comprising:
   segmenting data into a plurality of data segments;
   determining a data segment partitioning scheme for the plurality of data segments, wherein the data segment partitioning scheme partitions each of at least some data segments of the plurality of data segments into a plurality of portions and wherein size of portions of the plurality of portions of a first data segment of the at least some data segments is different than size of portions of the plurality of portions of a second data segment of the at least some data segments;
   partitioning, in accordance with the data segment partitioning scheme, the plurality of data segments into a multitude of pluralities of portions;
   for one of the multitude of pluralities of portions, entering a loop that includes:
      generating an encryption key based on a portion of the one of the multitude of pluralities of portions or on an encrypted portion;
      encrypting another portion of the one of the multitude of pluralities of portions using the encryption key to produce another encrypted portion;

when at least one portion of the one of the multitude of pluralities of portions is to be encrypted, repeating the loop for one of the at least one portion of the one of the multitude of pluralities of portions, wherein the other encrypted portion is the encrypted portion for generating the encryption key; and exiting the loop when the one of the multitude of pluralities of portions have been encrypted into a plurality of encrypted portions;

encoding, in accordance with an error-coding dispersal storage function, the plurality of encrypted portions to produce a set of encoded data slices; and outputting a plurality of sets of encoded data slices for storage in the distributed storage network, wherein the plurality of sets of encoded data slices includes the set of encoded data slices.

2. The method of claim 1 further comprises at least one of:
utilizing an encryption function for each pass through the loop to encrypt the other portion of the one of the multitude of pluralities of portions; and
utilizing different encryption functions for at least some passes through the loop to encrypt the other portion of the one of the multitude of pluralities of portions.

3. The method of claim 1, wherein generating the encryption key comprises:
for a first pass through the loop:
generating a hash value from the portion of the one of the multitude of pluralities of portions using a hash function; and
generating the encryption key based on the hash value; and
for subsequent passes through the loop:
generating another hash value from the encrypted portion using the hash function or a second hash function; and
generating the encryption key based on the other hash value.

4. The method of claim 3 further comprises:
setting the encryption key to the hash value or to the other hash value.

5. The method of claim 3 further comprises:
combining the hash value or the other hash value with a second value to produce a combined value; and
generating the encryption key based on the combined value.

6. A method for processing an encrypted data segment within a portion of a distributed storage network, the method comprising:
decoding, in accordance with an error-coding dispersal storage function, a set of encoded data slices to produce encrypted data;
segmenting encrypted data into a plurality of encrypted data segments;
determining a data segment partitioning scheme for the plurality of encrypted data segments, wherein the data segment partitioning scheme partitions each of at least some encrypted data segments of the plurality of encrypted data segments into a plurality of encrypted portions and wherein size of encrypted portions of the plurality of encrypted portions of a first encrypted data segment of the at least some encrypted data segments is different than size of encrypted portions of the plurality of encrypted portions of a second encrypted data segment of the at least some encrypted data segments;
partitioning, in accordance with the data segment partitioning scheme, the plurality of encrypted data segments into a multitude of pluralities of encrypted portions;
for one of the multitude of pluralities of encrypted portions, entering a loop that includes:
generating an encryption key based on an encrypted portion of the one of the multitude of pluralities of encrypted portions or on a decrypted portion;
decrypting another encrypted portion of the one of the multitude of pluralities of encrypted portions using the encryption key to produce another decrypted portion;
when at least one portion of the one of the multitude of pluralities of encrypted portions is to be decrypted, repeating the loop for one of the at least one encrypted portion of the one of the multitude of pluralities of encrypted portions, wherein the other decrypted portion is the decrypted portion for generating the encryption key; and
exiting the loop when the one of the multitude of pluralities of encrypted portions have been decrypted into a plurality of decrypted portions; and
combining multitudes of pluralities of decrypted portions to produce a plurality of decrypted data segments, wherein the multitude of pluralities of decrypted portions includes the plurality of decrypted portions.

7. The method of claim 6 further comprises at least one of:
utilizing a decryption function for each pass through the loop to decrypt the other encrypted portion of the one of the multitude of pluralities of encrypted portions; and
utilizing different decryption functions for at least some passes through the loop to decrypt the other encrypted portion of the one of the multitude of pluralities of encrypted portions.

8. The method of claim 6, wherein generating the encryption key comprises:
for a first pass through the loop:
generating a hash value from the encrypted portion of the one of the multitude of pluralities of encrypted portions using a hash function; and
generating the encryption key based on the hash value; and
for subsequent passes through the loop:
generating another hash value from the decrypted portion using the hash function or a second hash function; and
generating the encryption key based on the other hash value.

9. The method of claim 8 further comprises:
setting the encryption key to the hash value or to the other hash value.

10. The method of claim 8 further comprises:
combining the hash value or the other hash value with a second value to produce a combined value; and
generating the encryption key based on the combined value.

11. A distributed storage (DS) processing unit comprises:
a distributed storage network (DSN) interface; and
a grid module operable to encrypt data by:
segmenting the data into a plurality of data segments;
determining a data segment partitioning scheme for the plurality of data segments, wherein the data segment partitioning scheme partitions each of at least some data segments of the plurality of data segments into a plurality of portions and wherein size of portions of the plurality of portions of a first data segment of the at least some data segments is different than size of portions of the plurality of portions of a second data segment of the at least some data segments;
partitioning, in accordance with the data segment partitioning scheme, the plurality of data segments into a multitude of pluralities of portions;
encrypting the multitude of pluralities of portions using encryption keys generated from other portions of the multitude of pluralities of portions to produce a multitude of pluralities of encrypted portions; and encoding, in accordance with an error-coding dispersal storage function, the multitude of pluralities of encrypted portions to produce a plurality of sets of encoded data slices; and outputting, via the DSN interface, the plurality of sets of encoded data slices for storage in DSN;

the grid module is further operable to decrypt encrypted data by:

receiving, via the DSN interface, a plurality of sets of encoded encrypted data slices;

decode, in accordance with the error-coding dispersal storage function, the plurality of sets of encoded encrypted data slices to produce the encrypted data;

segmenting encrypted data into a plurality of encrypted data segments;

determining a data segment partitioning scheme for the plurality of encrypted data segments, wherein the data segment partitioning scheme partitions each of at least some encrypted data segments of the plurality of encrypted data segments into a plurality of encrypted portions and wherein size of encrypted portions of the plurality of encrypted portions of a first encrypted data segment of the at least some encrypted data segments is different than size of encrypted portions of the plurality of encrypted portions of a second encrypted data segment of the at least some encrypted data segments;

partitioning, in accordance with the data segment partitioning scheme, the plurality of encrypted data segments into a multitude of pluralities of encrypted data portions;

decrypting the multitude of pluralities of encrypted data portions using decryption keys generated from other encrypted data portions of the multitude of pluralities of encrypted data portions to produce a multitude of pluralities of decrypted portions; and combining the multitude of pluralities of decrypted portions to produce decrypted data.

12. The DS processing unit of claim 11, wherein the grid module is further operable to decrypt the encrypted data by:

entering a loop that includes:

generating a unique decryption key based on an encrypted portion of the one of the multitude of pluralities of encrypted portions or on a decrypted portion;

decrypting another encrypted portion of the one of the multitude of pluralities of encrypted portions using the unique decryption key to produce another decrypted portion;

when at least one portion of the one of the multitude of pluralities of encrypted portions is to be decrypted, repeating the loop for one of the at least one encrypted portion of the one of the multitude of pluralities of encrypted portions, wherein the other decrypted portion is the decrypted portion for generating the unique decryption key; and exiting the loop when the one of the multitude of pluralities of encrypted portions have been decrypted into a plurality of decrypted portions.

13. The DS processing unit of claim 12, wherein the grid module is further operable to generate the unique decryption key by:

for a first pass through the loop:

generating a hash value from the portion of the one of the multitude of pluralities of portions using a hash function; and generating the unique decryption key based on the hash value; and for subsequent passes through the loop:

generating another hash value from the encrypted portion using the hash function or a second hash function; and generating the unique decryption key based on the other hash value.

14. The DS processing unit of claim 13, wherein the grid module is further operable to generate the unique encryption key by at least one of:

setting the unique decryption key to the hash value or to the other hash value; and combining the hash value or the other hash value with a second value to produce a combined value and generating the unique decryption key based on the combined value.

15. The DS processing unit of claim 11, wherein the grid module is further operable to encrypt the data by:

for one of the multitude of pluralities of portions, entering a loop that includes:

generating a unique encryption key based on a portion of the one of the multitude of pluralities of portions or on an encrypted portion;

encrypting another portion of the one of the multitude of pluralities of portions using the unique encryption key to produce another encrypted portion;

when at least one portion of the one of the multitude of pluralities of portions is to be encrypted, repeating the loop for one of the at least one portion of the one of the multitude of pluralities of portions, wherein the other encrypted portion is the encrypted portion for generating the unique encryption key; and exiting the loop when the one of the multitude of pluralities of portions have been encrypted into a plurality of encrypted portions, wherein the encryption keys includes the unique encryption keys generated while executing the loop.

16. The DS processing unit of claim 15, wherein the grid module is further operable to generate the unique encryption key by:

for a first pass through the loop:

generating a hash value from the portion of the one of the multitude of pluralities of portions using a hash function; and generating the unique encryption key based on the hash value; and for subsequent passes through the loop:

generating another hash value from the encrypted portion using the hash function or a second hash function; and generating the unique encryption key based on the other hash value.

17. The DS processing unit of claim 16, wherein the grid module is further operable to generate the unique encryption key by at least one of:

setting the unique encryption key to the hash value or to the other hash value; and combining the hash value or the other hash value with a second value to produce a combined value and generating the unique encryption key based on the combined value.

* * * * *